United States Patent [19]

Oloff et al.

[11] Patent Number: 4,890,579
[45] Date of Patent: Jan. 2, 1990

[54] TIMED PRIMATE ROTO-POSITIONER

[75] Inventors: Clarence M. Oloff, Dayton; William G. Moss, Enon; Garry N. Holder, Dayton, all of Ohio; Linda M. Hermann, Norcross, Ga.

[73] Assignee: The United States of America as represented by the Secretary of the Air Force, Washington, D.C.

[21] Appl. No.: 788,199

[22] Filed: Oct. 17, 1985

[51] Int. Cl.[4] .......................... A61G 7/00; A01R 1/00
[52] U.S. Cl. .................................................. 119/103
[58] Field of Search .......................... 269/71; 119/103; 434/55, 59

[56] References Cited

U.S. PATENT DOCUMENTS

| | | | |
|---|---|---|---|
| Re. 26,475 | 10/1968 | Cohen | 244/1 |
| 2,707,465 | 5/1955 | Nemeth | 128/46 |
| 2,891,398 | 6/1959 | Hughes | 73/1 |
| 3,372,572 | 3/1968 | Campbell et al. | 73/1 |
| 3,457,899 | 7/1969 | Kelch et al. | 269/71 |
| 3,633,901 | 1/1972 | Lindquist | 119/103 |
| 3,700,228 | 10/1972 | Peale | 269/71 |
| 3,859,982 | 1/1975 | Dove | 128/2 R |
| 4,120,266 | 10/1978 | Oloff et al. | 119/103 |
| 4,175,723 | 11/1979 | Shea, Jr. | 244/121 |
| 4,710,128 | 12/1987 | Wachsmuth et al. | 434/55 |

FOREIGN PATENT DOCUMENTS

| | | | |
|---|---|---|---|
| 1909258 | 2/1969 | Fed. Rep. of Germany | 434/55 |
| 6716493 | 6/1969 | Netherlands | 434/55 |

OTHER PUBLICATIONS

"Effects of Acute Hypogravic Exposure and Recovery on the Vertebral Column of Juvenile Primates (Macaca Mulatta)", E. Paul France, Katherine C. Smith, Clarence M. Oloff, and Leon E. Kazarian, Jun. 1984, PhD dissertation.

*Primary Examiner*—David A. Scherbel
*Assistant Examiner*—Caroline D. Dennison
*Attorney, Agent, or Firm*—Fredric L. Sinder; Donald J. Singer

[57] ABSTRACT

An apparatus for rotating subhuman primate animal test subjects about one or more axes to minimize trauma during simulated zero or micro-gravity studies. The timed roto-positioning apparatus has a frame, a subframe rotatably attached to the frame, and a carrier for a primate restraint system rotatably attached to the subframe. Two motors, controlled by a programmable controller, individually rotate the subframe and the carrier according to a preselected sequence. The preferred embodiment is a modified A-frame structure made from welded channel aluminum beams and equipped with casters and lifters to move and securely position the apparatus. A tube with rotatable fittings is used to supply drinking water to test animals and electrical slip rings are used for transmitting physiological sensor signals from the test animal through the rotating connections of the carrier, subframe and frame. Radio telemetry may be used in place of the electrical slip rings. The invention also includes the method of rotating an immobilized or immobile test subject or patient along at least one axis to minimize trauma and to simulate weightlessness.

11 Claims, 2 Drawing Sheets

TIMED PRIMATE ROTO-POSITIONER

RIGHTS OF THE GOVERNMENT

The invention described herein may be manufactured and used by or for the Government of the United States for all governmental purposes without the payment of any royalty.

BACKGROUND OF THE INVENTION

This invention relates generally to test animal restraint devices, and more particularly to a rotating positioner for subhuman primate restraint systems to minimize tramua to test animals.

Small animals, most commonly subhuman primates such as rhesus monkeys, are frequently used in ground-based studies of the effects of simulated weightlessness. These studies simulate the effects of weightlessness by immobolizing test animals for periods of time to study muscular atrophy and bone loss.

Examples of past methods of immobolizing animals include full body plaster-of-paris casts; tenectomy, or slicing and removing tendons; and denervation. Even with considerable care taken in casting animals, full body casts introduce intense psychic trauma for test animals, introducing experimental variables and delays, including abrupt termination of experiments. Weight loss and the development of decubital ulcers at bony prominences when using full body casts further reduce the length of experimental exposure. Partial casts have been used on rats, but it has been difficult correlating data obtained from quadrupeds with that from primates.

Tenectomy and denervation are operations, introducing additional variables into experiments.

A significant improvement over other immobilization techniques may be found in U.S. Pat. No. 4,120,266, to C. M. Oloff, et al. The Oloff, et al. patent described a subhuman primate restraint system which has been successfully used in restraining subhuman primates for relatively short term centrifuge tests. The Oloff, et al. restraint system uses a combination of clamps and straps to secure the test animal to padded supports. While the Oloff, et al. restraint system is preferred over other immobilization methods, in a stationary test apparatus over an extended period of simulated weightlessness testing, it may still cause decubitus ulcers and other trauma to test animals.

It is, therefore, a principal object of the present invention to provide an apparatus and method for using a test animal restraint system in immobilizing test animals for simulated weightlessness and other long term tests that will minimize traumas.

A feature of the present invention is that it is an open framework design providing convenient access to the test animal.

Another feature of the present invention is that it provides for convenient positioning of the test animal for administering medication, performing tests, and other procedures on the test animal.

An advantage of the present invention is that it works independently of the specific test animal restraint method or apparatus used. Therefore, it may be used with almost any test animal restraint system.

These, and other objects, features and advantages of the present invention will become apparent as the detailed description of certain representative embodiments thereof proceeds.

SUMMARY OF THE INVENTION

In accordance with the foregoing principles and objects of the present invention, a novel primate roto-positioning apparatus is described which provides an attachment location for a primate restraint system and allows rotation of the primate restraint system about two axes.

The invention has a frame with a subframe rotatably attached to the frame, and a primate restraint system carrier rotatably attached to the subframe so that the carrier rotates about an axis at an angle, generally perpendicular, to the axis of rotation of the subframe. Two motors, controlled by a programmable controller, individually rotate the subframe and the carrier.

A preferred embodiment of the apparatus is described which uses channel and angle aluminum beams to form the frame and subframe. The preferred embodiment includes casters and lifters mounted on the frame to facilitate movement and secure locating of the entire apparatus. The preferred embodiment also includes means for supplying drinking water to test animals and electrical slip rings for transmitting physiological sensor signals from the test animal through the rotating connections of the carrier, subframe and frame. The invention includes radio-telemetry in place of electrical slip rings for transmitting physiological snesor signals.

The invention also includes the method of rotating an immobilized or immobile test subject or patient along at least one axis to minimize trauma and to simulate weightlessness.

DESCRIPTION OF THE DRAWINGS

The present invention will be more clearly understood from a reading of the following detailed description in conjunction with the accompanying drawings wherein.

DETAILED DESCRIPTION

Figure 1:
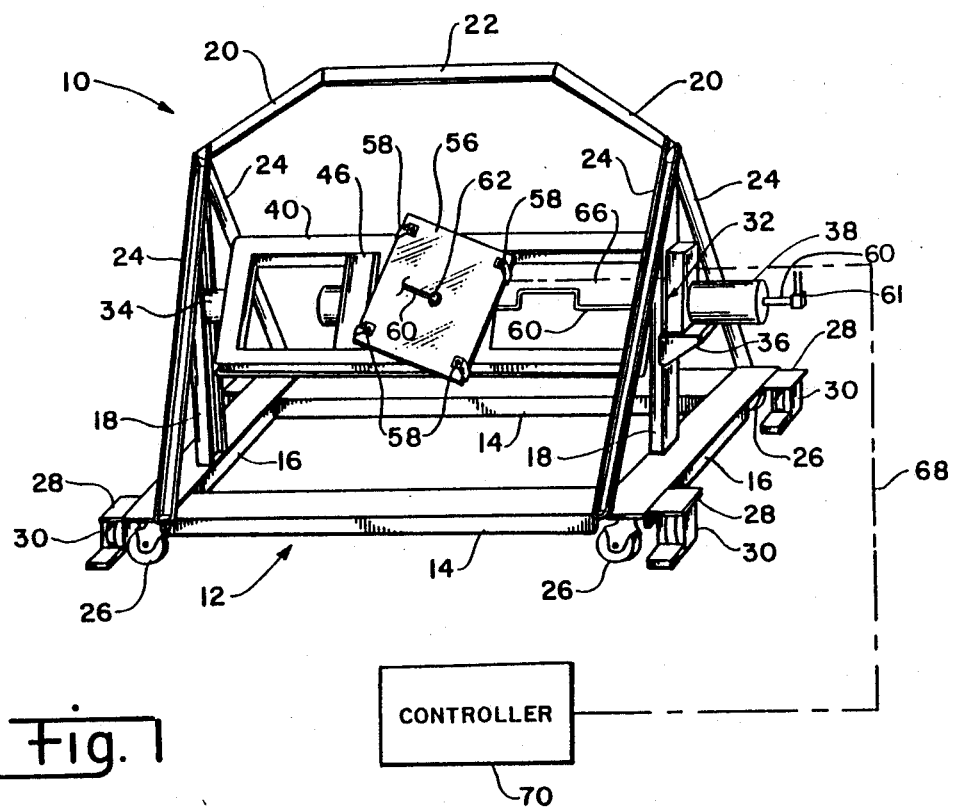
FIG. 1 is a perspective view of the present invention

Referring now to FIG. 1 of the drawings, there is shown a perspective view of a preferred embodiment of the timed primate roto-positioner. The roto-positioner comprises a frame 10 made by welding together lengths of aluminum beams. The bottom frame section 12 is made of two long lengths 14 of channel aluminum welded to two short lengths 16 of channel aluminum to form a rectangle. Two riser channel aluminum beams 18 are perpendicularly welded to the midpoint of the short sides 16 of the bottom frame section 12 and extend to meet and be welded to a pair of overhead channel aluminum beams 20. The overhead beams 20 inwardly extend at about 45 degree angles to meet and be welded to a single horizontal channel aluminum top beam 2.

Two pairs of channel aluminum buttress beams 24 are welded between the corners of the bottom frame section 12 and the top of the riser beams 18.

Casters 26 are mounted to the four corners of the bottom frame section 12. Welded to the short sides 16 on the four corners of the bottom frame section 12 are tabs 28 to which are mounted lifters 30.

Bearings 32 and 34 are each mounted about midway on the riser beams 18. A motor mount 36 is welded on one riser beam 18 below one bearing 32. Mounted on the motor mount 36 is a motor and gear assembly 38. A hollow shaft 39 extends from the motor and gear assembly 38 through the bearing 32 to rotate a rectangular subframe 40. The other end of the subframe 40 mounts in the opposite bearing 34, allowing the subframe 40 to rotate along a horizontal axis.

Figure 2:
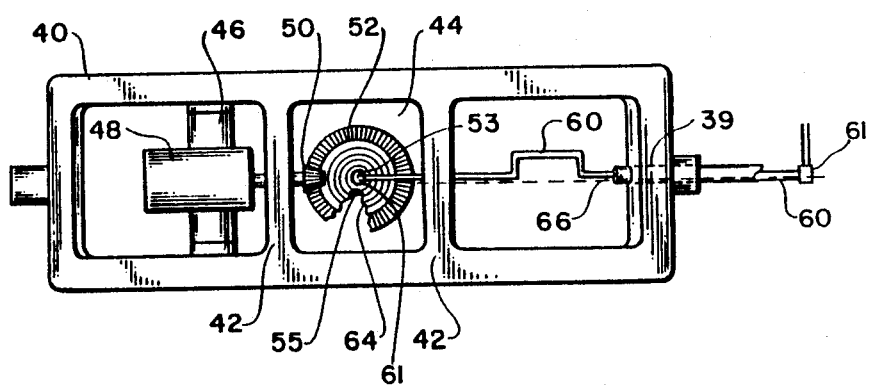
FIG. 2 is a bottom view of a subframe of the invention showing a motor and gears for rotating an attached primate restraint system carrier.

Referring now to FIG. 2, showing a bottom view of the subframe 40, and seen in conjunction with FIG. 1, there is shown a pair of metal cross-beams 42 connected across the subframe 40 to provide a mounting connection for a plate 44. Another metal cross-beam operates as a motor mount 46. Mounted to the motor mount 46 is a motor 48. The motor 48 drives the pinon gear 50 of a beveled ring and pinion gear set. The ring gear 52 has a hollow shaft 53 extending through a bearing 55 (shown in cutaway view beneath ring gear 52) mounted in the plate 44 and connected to a carrier 56 so that the carrier 56 rotates in a direction perpendicular to the axis of rotation of the subframe 40. The carrier 56 has mounting means, shown as clamps 58 in this embodiment, for attaching a primate restraint system, such as described in U.S. Pat. No. 4,120,266. A pair of rails forming the bottom of a primate restraint system may be inserted under the clamps 58, slidably adjusted for proper center of gravity orientation, and the clamp bolts tightened to secure the rails under the clamps 58.

A water line 60 extends through rotating liquid swivel fittings 61 from outside the frame 10 through hollow shaft 39 to inside the subframe 40 and through hollow shaft 53 and an access hole 62 through the carrier 56. A simple liquid swivel fitting, not shown in the Figures, is located above carrier 56 as part of the attachments for the primate restraint system and, through water line 60, provides drinking water to the test animal through a licking dispenser, which is well known in the art.

Urine and feces from the test animal are collected in a tray placed beneath the subframe 40 and carrier 56.

An assembly of electrical slip rings 64 mount inside a cutout portion of the ring gear 52 to carry low signal level outputs from physiological transducers, as might be used to monitor heart rate or brain wave activity, and which are attached to the test animal. The signals are carried by wires or other means, shown schematically as a dashed line 66, to another assembly of slip rings 63 (hidden in this view) mounted by the bearing 32, and carried by wires or other means extending outside the frame 10, shown schematically by a dashed line 68.

Figure 3:
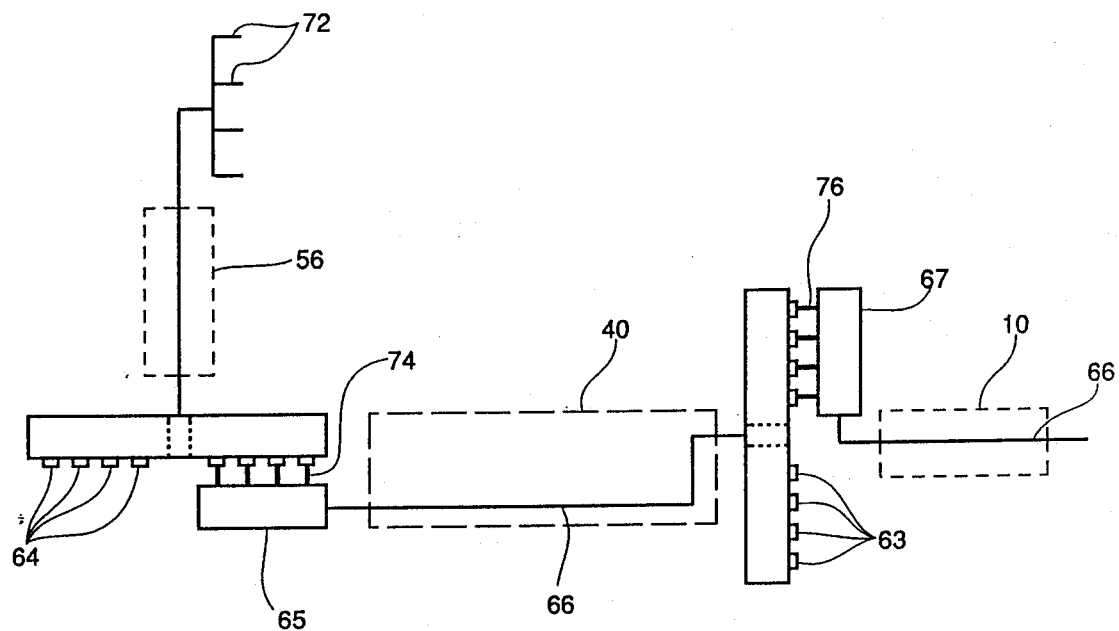
FIG. 3 is a representational diagram of an example connection of slip rings and slip ring brushes showing the transmission of physiological sensor and other signals across two separate rotational axes of the connected frame, subframe and carrier of the present invention.

Referring now to FIG. 3, there is shown a simplified diagram of an example connection of slip rings 64 and 63 with a pair of corresponding slip ring brush assemblies 65 and 67. FIG. 3 representationally shows how physiological sensor and control signals are tranmitted across two separate rotational axes of connected frame 10, subframe 40 and carrier 56. Leads 72 connect to the physiological transducers on the test animal and are bundled together to connect to individual slip rings 64 inside the cutout under ring gear 52. Corresponding brushes 74 on brush assembly 65 wipe across rotating individual slip rings 64 to transmit signals carried by them from carrier 56, which rotates relative to subframe 40, to wires or other means 66 which are stationary relative to subframe 40. Additional wires or other means 66 connect to brushes 76 on brush assembly 67 which transmits the carried signals from slip rings 63 which rotates with subframe 40 relative to frame 10.

The signals from the physiological transducers, along with control lines for motor and gear assembly 38 and motor 48, extend beyond the frame along schematic paths 66 and 68 to a programmable controller and monitor 70. Typically, the controller 70 will be a microcomputer capable of controlling the motors, monitoring the physiological signals, and issuing an alarm in the event of incident. The controller 70 can be as simple as a timer for the motors and mechanical plotters for the physiological signals.

When the invention is used for immobilization studies, the test animal is restrained in a primate restraint system attached to the carrier 56. The casters 26 allow easy movement of the entire test apparatus from one location to another and the lifters 30, which extend to lift the casters off the floor, allow the apparatus to be securely positioned. Operation of the programmable controller 70 activates the motor and gear assembly 38 and the motor 48 to cause subframe 30 and carrier 56 to rotate in any direction, allowing convenient positioning of the primate restraint system to facilitate placing the test animal in the restraints and later feeding and other care.

After test preparations are complete, the controller 70 is programmed to perform a preselected sequence of rotations of the subframe 40 and the carrier 56. The rotations may be intermittent or continuous and may include full 360 degree sweeps or rocking motions through various arcs. The subframe 40 and the carrier 56 may rotate together or separately.

In previous tests the controller 70 has been programmed to intermittently drive the motor and gear assembly 38 to every thirty minutes slowly turn the subframe 40 ninety degrees. Each ninety-degree stop has left the test animal facing straight up, straight down, or directly to the left or right, and with its spine parallel to the axis of rotation of the subframe. In addition to the immobilization imposed by the primate restraint device, this intermittent sequence of rotation has successfully produced a uniform deloading of gravitationally induced stress on the tested monkeys. In addition, the rotation has prevented the development of ulcers and other sores on the test animal at restraint contact points and bony prominences. It has also helped prevent the development of hypostatic pneumonia, which may develop from the natural accumulation of fluids toward the bottom of the lungs of a test subject forced to remain in a stationary position for long periods of times, and reduces abdominal swelling. An advantage of the described use of the invention is that the prevention of physical trauma has also prevented psychic trauma, so that the tested monkeys willingly accept feeding and otherwise adapt well to the test apparatus and method.

Routine experimentation will produce other successful sequences of rotation, and will disclose other uses for the apparatus and its convenient positioning capabilities.

It will be seen by those skilled in the art that this invention has application to human patients who, due to coma or other severe medical problems eliminating mobility, develop bedsores and other problems similiar to those experienced by test animals in simulated zero or micro-gravity studies.

It is understood that certain modifications to the invention as described may be made, as might occur to one with skill in the field of this invention, within the scope of the claims. Therefore, all embodiments contemplated have not been shown in complete detail. Other embodiments may be developed without departing from the spirit of the invention or from the scope of the appended claims.

We claim:

1. A primate restraint system positioning apparatus, comprising:
   a frame;
   a subframe rotatably attached to the frame;
   carrier means for attaching a test animal restraint system rotatably attached to the subframe, the carrier rotating on an axis at an angle to the axis of rotation of the subframe;
   first motor means for rotation the subframe;
   second motor means for rotating the carrier; and,
   means for controlling the operation of the first and second motor means, the controlling means including means for automatically causing rotation of the subframe and of the carrier according to a preselected sequence, wherein the preselected sequence averages the net gravitational loading over the time on test animal body parts to substantially zero.

2. The primate restraint system positioning apparatus according to claim 1, wherein the means for automatically causing rotation causes intermittent rotation.

3. A primate restraint system positioning apparatus, comprising:
   a frame;
   a subframe rotatably attached to the frame;
   carrier means for attaching a test animal restraint system rotatably attached to the subframe, the carrier rotating on an axis perpendicular to the axis of rotation of the subframe;
   first motor means for rotating the subframe;
   second motor means for rotating the carrier; and,
   means for controlling the operation of the first and second motor means, the controlling means including means for automatically causing rotation of the subframe and of the carrier according to a preselected sequence, wherein the preselected sequence averages the net gravitational loading over time on test animal body parts to substantially zero.

4. The primate restraint system positioning apparatus as described in claim 3, further comprising means for transmitting physiological sensor signals from the test animal.

5. The primate restraint system positioning apparatus as described in claim 3, further comprising a plurality of means for transmitting physiological sensor signals through the rotatable connections of the carrir and subframe, and of the subframe and frame.

6. The primate restraint system positioning apparatus as described in claim 5, wherein the transmitting means include a plurality of electrical slip rings.

7. The primate restraint system as described in claim 3, further comprising means for supplying drinking water to the test animal.

8. The primate restraint system positioning apparatus according to claim 3, wherein the means for automatically causing rotation causes intermittent rotation.

9. A primate restraint system positioning apparatus, comprising
   a frame;
   a subframe rotatably attached to the frame;
   carrier means for attaching a test animal restraint system rotatably attached to the subframe, the carrier rotating on an axis at an angle to the axis of rotation of the subframe;
   first motor means for rotating the subframe;
   second motor means for rotating the carrier;
   means for controlling the operation of the first and second motor means, the controlling means including means for automatically causing rotation of the subframe and of the carrier according to a preselected sequence; and,
   wherein the frame comprises:
   two short and two long bottom beams connected to form a horizontal rectangular bottom frame section;
   two vertical riser beams perpendicularly attached at their bottom ends one each to midway on the short sides of the bottom frame section;
   a pair of overhead beams each connected at their first ends one each to the upper end of a riser beam and extending inwardly at opposite about 45 degree angles from the horizontal to each met and be connected at their second ends by a single horizontal top beam; and,
   two pairs of buttress beams attached at their bottom ends one each to the four corners of the bottom frame section, and at their top ends to the upper end of a vertical riser beam, each pair of buttress beams defining the shape of an isosceles triangle along with a short side of the bottom frame section.

10. The primate restraint system positioning apparatus as described in claim 9, further comprising:
    a plurality of casters connected to the bottom frame section; and,
    a plurality of lifters connected to the bottom frame section.

11. A primate restraint system positioning apparatus, comprising:
    two short and two long bottom beams connected to form a horizontal rectangular bottom frame section;
    a plurality of casters connected to the bottom frame section;
    a plurality of lifters connected to the bottom frame section;
    two vertical riser beams perpendicularly attached at their bottom ends one each to midway on the short sides of the bottom frame section;
    a pair of overhead beams each connected at their first ends one each to the upper end of an riser beam and extending inwardly at opposite about 45 degree angles from the horizontal to each meet and be connected at their second ends by a single horizontal top beam;
    two pairs of buttress beams attached at their bottom ends one each to the four corners of the bottom frame section, and at their top ends to the upper end of a riser beam, each pair of buttress beams defining the shape of an isosceles triangle along with a short side of the bottom frame section;
    a first and a second bearing means each mounted about midway on said vertical riser beams;
    a first motor mount attached to one vertical riser beam below the first bearing means;
    first motor and gear means mounted on the first motor mount, the first motor and gear means having a first shaft extending through the first bearing means;

a rectangular subframe attached midway along one short side to the first motor and gear means first shaft on one side, and midway along the other short side to the second bearing means, allowing rotation of the subframe along an horizontal axis;

a plurality of cross-beams connected across the subframe;

a plate mounted on a rectangle defined by the cross-beams and portions of the long sides of the subframe;

third bearing means mounted in the center of the plate;

a second motor mount attached to the subframe;

second motor means mounted on the second motor mount and parallel to the axis of rotation of the subframe;

second gear means having a second shaft extending through the third bearing means, the second shaft rotating at right angles to the axis of rotation of the second motor means;

a square carrier attached at its center to the second shaft, allowing rotation around an axis through the center of the carrier and perpendicular to the axis of rotation of the subframe, the carrier having mounting means for the attachment of a primate restraint system;

a water tube having rotatable fittings extending from outside the subframe to the carrier;

two electrical slip ring assemblies mounted one each near the first bearing means and the third bearing means, allowing the transmission of physiological sensor signals through the rotatable connections of the carrier and subframe, and of the subframe and frame; and, means for controlling the operation of the first and second motor means, the controlling means including means for automatically causing rotation of the subframe and of the carrier according to a preselected sequence.

* * * * *

UNITED STATES PATENT AND TRADEMARK OFFICE
CERTIFICATE OF CORRECTION

PATENT NO. : 4,890,579

DATED : January 2, 1990

INVENTOR(S) : Clarence M. Oloff et al

It is certified that error appears in the above-identified patent and that said Letters Patent is hereby corrected as shown below:

```
Col 1, line 38, "described" should be "describes".
Col 2, line 26, "snesor" should be "sensor".
Col 2, line 63, "beam 2" should be "beam 22".
Col 3, line 18, "pinon" should be "pinion".
Col 3, line 59, "tranmitted" should be "transmitted".
Col 5, claim 1, line 18, "rotation" should be "rotating".
Col 5, claim 1, line 25, "over the time" should be "over time".
Col 5, claim 5, line 54, "carrir" should be "carrier".
Col 5, claim 9, line 66, "comprising" should be "comprising:"
```

Signed and Sealed this

First Day of January, 1991

Attest:

HARRY F. MANBECK, JR.

*Attesting Officer*     Commissioner of Patents and Trademarks